(12) United States Patent
Oki (10) Patent No.: US 7,770,470 B2
(45) Date of Patent: Aug. 10, 2010

(54) POINTER OPERATION APPARATUS AND PROGRAM FOR CONTROLLING SAME

(75) Inventor: Tetsuya Oki, Kariya (JP)

(73) Assignee: DENSO CORPORATION, Kariya (JP)

( * ) Notice: Subject to any disclaimer, the term of this patent is extended or adjusted under 35 U.S.C. 154(b) by 222 days.

(21) Appl. No.: 11/896,459

(22) Filed: Aug. 31, 2007

(65) Prior Publication Data

US 2008/0053248 A1 Mar. 6, 2008

(30) Foreign Application Priority Data

Sep. 5, 2006 (JP) ............................. 2006-240270

(51) Int. Cl.
*G01L 3/16* (2006.01)
(52) U.S. Cl. .................................... 73/862.09
(58) Field of Classification Search ............. 73/862.08, 73/862.09, 862.53; 715/701; 345/156–184
See application file for complete search history.

(56) References Cited

U.S. PATENT DOCUMENTS

| | | | | |
|---|---|---|---|---|
| 5,877,749 A * | 3/1999 | Shiga et al. | ................. | 345/168 |
| 6,266,046 B1 * | 7/2001 | Arita | .......................... | 345/156 |
| 6,593,667 B1 | 7/2003 | Onodera et al. | | |
| 6,646,632 B2 * | 11/2003 | Wegmuller et al. | ........ | 345/163 |
| 6,885,925 B2 | 4/2005 | Sanpei et al. | | |
| 7,176,891 B2 * | 2/2007 | Inukai, Atsuomi | .......... | 345/161 |
| 7,239,304 B2 * | 7/2007 | Hoshino et al. | ............. | 345/175 |
| 7,245,289 B2 * | 7/2007 | Matsumoto et al. | ........ | 345/161 |
| 7,394,399 B2 * | 7/2008 | Aoki | .................... | 340/815.78 |
| 7,417,396 B2 * | 8/2008 | Yoshida et al. | .............. | 318/466 |
| 2004/0020704 A1 | 2/2004 | Sunda et al. | | |
| 2004/0085294 A1 | 5/2004 | Michelitsch et al. | | |
| 2005/0259076 A1 * | 11/2005 | Hayasaka et al. | .......... | 345/161 |
| 2007/0024120 A1 | 2/2007 | Yoshida et al. | | |

FOREIGN PATENT DOCUMENTS

| | | |
|---|---|---|
| JP | A-9-026850 | 1/1997 |
| JP | A-2002-365060 | 12/2002 |

* cited by examiner

*Primary Examiner*—Lisa M Caputo
*Assistant Examiner*—Octavia Davis
(74) *Attorney, Agent, or Firm*—Posz Law Group, PLC (57) ABSTRACT

A pointer operation apparatus having a reaction force to a user operation changes an intensity of the reaction force according to respective users and/or user's conditions by using an operation unit, a force applicator, and other units. The intensity of the reaction force is determined by the pointer operation apparatus based on a relationship between a position of a pointer on a display unit and the reaction force applied to the operation unit, and the force applicator is controlled according to the relationship and the pointer position by the pointer operation apparatus. The relationship is changed based on a history of a pointer position movement (e.g., a speed/path of a pointer movement) recorded by the pointer operation apparatus.

20 Claims, 7 Drawing Sheets

POINTER OPERATION APPARATUS AND PROGRAM FOR CONTROLLING SAME

CROSS REFERENCE TO RELATED APPLICATION

This application is based on and claims the benefit of priority of Japanese Patent Application No. 2006-240270 filed on Sep. 5, 2006, the disclosure of which is incorporated herein by reference.

FIELD OF THE DISCLOSURE

The present disclosure generally relates to a pointer operation apparatus for use in a vehicle.

BACKGROUND INFORMATION

An operating apparatus outputting a signal showing a position of an operating member (e.g., a handle part of a joy-stick) moved by an operation of a user is conventionally used in various field. When a display controller of an apparatus such as navigation apparatuses receives an output signal from the operating apparatus, the display controller uses the output signal for moving a pointer in an image on an image display unit.

In addition, an operating apparatus proposed in, for example, Japanese Patent Document JP-A-2001-84875 (also published as a patent document U.S. Pat. No. 6,593,667) to reduce necessity to watch the pointer in the image for operation applies a reactive force (a force in an opposite direction to the operation of the operating member by the user) or a thrust force (a force in the same direction of the operation of the operating member by the user) to the operating member.

However, for example, the operating apparatus may be operated by a user from a driver's seat side or from a navigator's seat side depending on a situation. Further, the same user may apply an operation force differently depending on a physical condition of the day, a fatigue or the like. A technique which a user can set an intensity of the reactive force for operating the operating member is proposed in Japanese Patent Document JP-A-2003-260949 (also published as a patent document U.S. Pat. No. 6,885,925) to cope with the change of the user condition.

However, the operation for setting the intensity of the reactive force may cause burdens for the user.

SUMMARY OF THE DISCLOSURE

In view of the above and other problems, the present disclosure provides descriptions of a pointer operation apparatus having a force applicator that outputs a position signal to a display control unit based on a position of an operating member for controlling a pointer position on a screen of a display unit and for controlling a force to be applied to the operating member from the force applicator after determining a relationship between the pointer position and the intensity of the force from the force applicator.

The pointer operation apparatus in the present disclosure is characterized by a pointer movement history recorded thereon for changing the relationship between the pointer position and the force from the force applicator.

In the above description, the pointer indicates an image for pointing a position on a display screen of an image display unit in a movable manner to be visually recognized by a user.

The pointer operation apparatus in the present disclosure adjusts the force from the force applicator for based on an actual pointer movement in the movement history, thereby enabling a dynamic adjustment of the relationship according to each of respective users and/or user's conditions.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present disclosure are described with reference to the accompanying drawings.

First Embodiment

Figure 1:
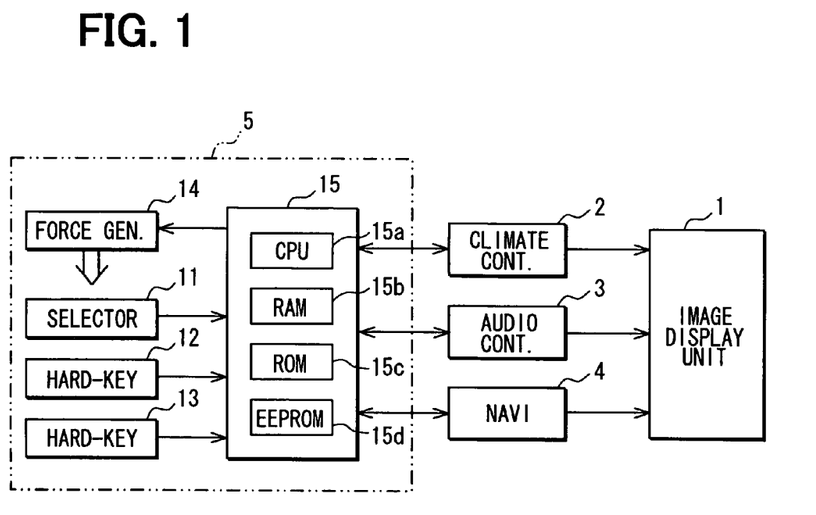
FIG. 1 shows a block diagram of an image display system and a pointer operation apparatus in an embodiment of the present disclosure.

The first embodiment of this disclosure is explained as follows. FIG. 1 shows an overall configuration of an image display system carried by a vehicle in the present embodiment. The image display system includes the image display unit 1, the climate controller 2, an audio controller 3, a navigation apparatus 4 for use in a vehicle and a pointer operation apparatus 5.

The image display unit 1 displays an image according to a signal for drawing an image from the climate controller 2, the audio controller 3 and the navigation apparatus 4. The pointer operation apparatus 5 can accept a drawing instruction from only one of these display control apparatuses 2-4 at a time. Therefore, the image display unit 1 switches a subject apparatus among these display control apparatuses 2-4 for currently accepting the draw instruction.

For example, when the pointer operation apparatus 5 receives a signal of a control acquisition request from one of the display control apparatuses 2-4, the pointer operation apparatus 5 receives a drawing instruction from the origin of the request signal for drawing an image based on the drawing instruction.

The climate controller 2 is a device regulating atmospheric environment in a vehicle such as temperature and the like. The climate controller 2 uses an operation signal from the pointer operation apparatus 5 for determining a content of an operation such as target temperature or the like.

The audio controller 3 is an equipment that outputs sound of voice, music and the like from a speaker in the vehicle (not illustrated in the figure). The audio controller 3 determines a content of operation such as songs (i.e., playback of songs) output from the speaker based on the operation signal which is received from the pointer operation apparatus 5.

The navigation apparatus 4 is an equipment that makes the image display unit 1 display a map around a current position and a path to a destination. The navigation apparatus 4 for a vehicle uses in the operation signal received from the pointer operation apparatus 5 to determine a content of operation such as a destination setting method (e.g., the method that uses address, telephone number and the like), a destination identification and the like.

Figure 2:
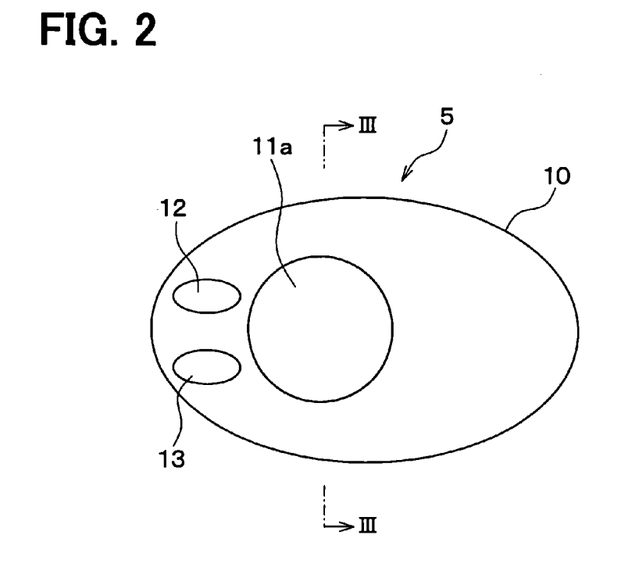
FIG. 2 shows a plan view of the pointer operation apparatus.
Figure 3:
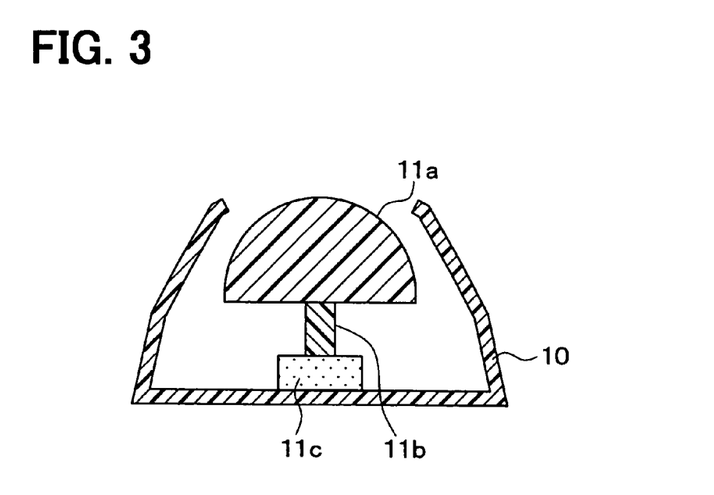
FIG. 3 shows a cross-sectional view of the pointer operation apparatus along a line III-III in FIG. 2.

The pointer operation apparatus 5 is an equipment for outputting the signal of user operation to one of the climate controller 2, the audio controller 3, and the navigation apparatus 4. FIGS. 2 and 3 shows a plan view and a cross section of the pointer operation apparatus 5 along a line III-III.

The pointer operation apparatus 5 has a housing 10, a selector 11, a hard-key 12, a hard-key 13, a force generator 14, and a signal processing unit 15 as shown in FIGS. 1-3.

The housing 10 forms a body of the image display unit 1, and it serves as a case made of resin for protecting device in an inside of the case.

The selector 11 has an operating member 11a, a transmission stick 11b and a detecting circuit 11c.

The operating member 11a made of resin extends toward an outside from an inside of the housing 10 in an exposing manner, and moves in a front-rear/right-left direction (rightward/leftward/upward/downward on a surface of FIG. 2) on a two dimensional plane by receiving a contact force from a user. The transmission stick 11b is fixed on the operating member 11a to convey the movement of the operating member 11a to the detecting circuit 11c by inclining in an angle according to the movement of the operating member 11a. The detecting circuit 11c detects an inclination of the transmission stick 11b (i.e., the movement of the operating member 11a), and outputs a detection signal of the detection result to the signal processing unit 15. In this manner, the selector 11 outputs a signal that represents the movement of the operating member 11a under an operation of a user to the signal processing unit 15.

Each of the hard-keys 12 and 13 extends from an inside to an outside of the housing 10 to be exposed therefrom, and detects a press-down operation upon being pressed-down by a user for outputting a detection signal to the signal processing unit 15.

The force generator 14 is, based on a control from the signal processing unit 15, an actuator for exerting force on the operating member 11a or the transmission stick 11b. The operating member 11a receives force directly from the force generator 14 or indirectly from this force generator 14 through the transmission stick 11b.

The signal processing unit 15 has a CPU 15a, a ROM 15c and an EEPROM 15d. The CPU 15a executes a program retrieved from the RAM 15b, the ROM 15c, or the EEPROM 15d, and performs read/write of information from and to the RAM 15b, the ROM 15c, or the EEPROM 15d, as well as exchanging signals with the selector 11, the hard-keys 12,13, and the force generator 14.

An operation of the image display system described above is explained in the following.

Figure 4:
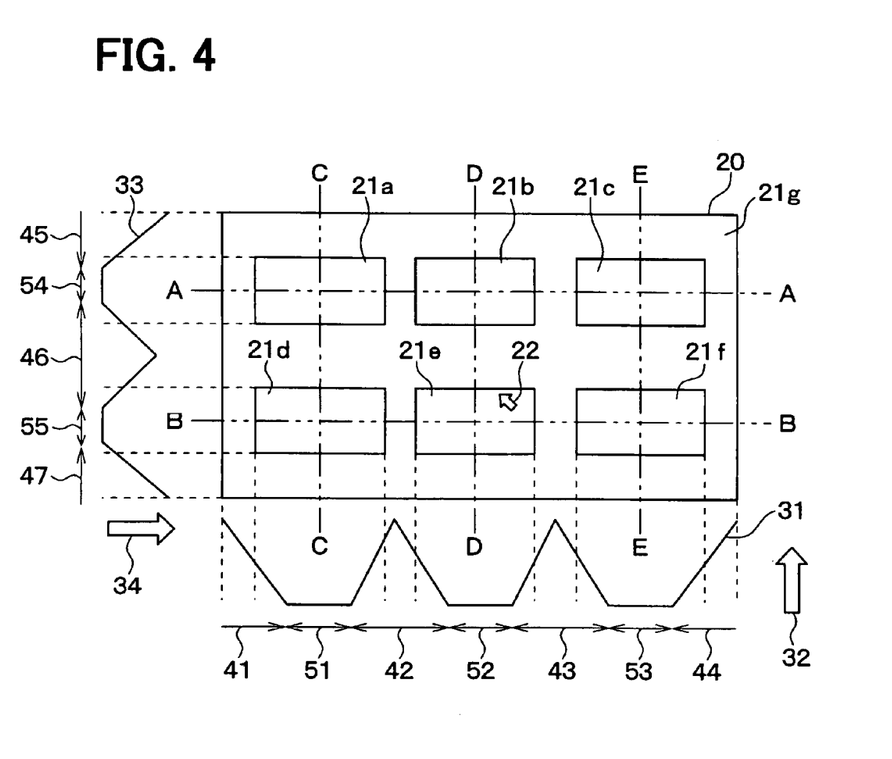
FIG. 4 shows an illustration of selection images and a pointer on a screen together with a potential distribution in the screen.

The display control apparatuses 2-4 outputs a control acquisition request signal to the image display unit 1 and outputs a control acquisition notice signal to the pointer operation apparatus 5, due to a requirement for accepting various user selections during its operation. And the display control apparatuses 2-4 displays images and a pointer for selecting operation on the image display unit 1 for accepting the various user selections. FIG. 4 shows an example of image pieces 21a-g and a pointer 22 in a display screen 20 in the image display unit 1 for user selections based on a control from the display control apparatuses 2-4.

In FIG. 4, six pieces of rectangular button shape images 21a-f to be selected by the user are displayed in the display screen 20 in an array of two lines by three columns. Further, a inter-button image 21g between buttons are displayed around and between these button shape images 21a-f.

After receiving the control acquisition notice signal from one of the display control apparatus 2-4, the CPU 15a of the signal processing unit 15 identifies one of the display control apparatuses 2-4 as an active apparatus until another control acquisition notice signal is received. Further, the CPU 15a repeatedly executes a program 100 in FIG. 5 with the identified active apparatus as a subject of the program.

Figure 5:
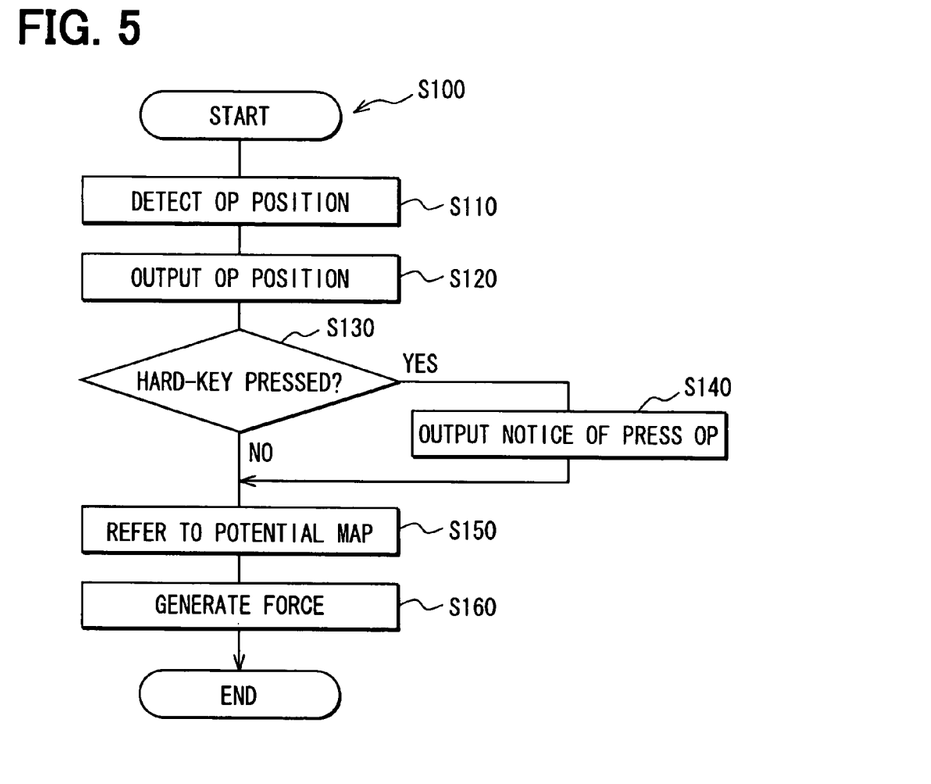
FIG. 5 shows a flowchart of a program executed by a CPU in a signal processing unit.

At first, in step S10, the CPU 15a determines, based on a detection signal from the detecting circuit 11c, an operation position of the operating member 11a (i.e., a two-dimensional position of the operating member 11a or an inclination direction/angle of the transmission stick 11b).

In step S120, two dimensional coordinate information of a determined operation position is output as an operation signal to the display control apparatus currently having a control, that is, to the active apparatus. In this case, a two dimensional movable range of the operating member 11a in the pointer operation apparatus 5 and a two dimensional display area on the screen of the image display apparatus 1 are associated in a one-to-one corresponding manner in advance. That is, when the position of the operating member 11a is uniquely determined, the corresponding position in the screen is also uniquely determined.

When the active apparatus receives the operation signal output in step S120, it outputs a pointer draw instruction to the image display unit 1 based on the operation signal. More practically, when received operation signal is a two-dimensional coordinate information of the operating member 11a, a pointer draw instruction for moving the pointer to the position indicated by the coordinate information on the screen is output to the image display apparatus 1.

In this manner, the image display unit 1 can display the pointer in a position on the screen corresponding to a position of the operating member 11a that is moved according to an operation of a user.

Next, in step S130, the CPU 15a determines whether one of the hard-keys 12, 13 is pressed down. When one of the hard-keys 12, 13 is being pressed down, the process executes step S140. When no key is pressed down, the process executes step S150.

In step S140, the process outputs a signal showing a decided selection to the active apparatus, and step S150 is executed successively. When the pointer is positioned, for example, on one of the image pieces 21a-f being selectable as shown in FIG. 4, the active apparatus executes a predetermined function in association with the pointed image piece upon receiving the decided selection signal.

The predetermined function is, for example, a target temperature adjustment (i.e., an increase or decrease) of the climate controller 2. The predetermined function for the audio controller 3 is a determination for playing a song in one of storage media among plural storage medium options (e.g., a CD-ROM, an FM radio, a hard disk drive or the like). The predetermined function for he navigation apparatus 4 is the decision of what method is used to set a destination.

In step S150, the CPU 15a refers to a potential map in the RAM 15b or in the EEPROM 15d. The potential map is data for assigning a potential value to each of the positions in an image used for the user selection. As described later in detail, an inclination of the potential along an arbitrary direction in the image for the user selection represents a magnitude of the force to be applied to the operating member 11a in the same direction.

In step S160, the force generator 14 generates an energization force based on the potential map referred to in step S150. More practically, the CPU 15a controls the force generator 14 to generate a force that is proportional to the inclination of the potential contour toward a downward direction perpendicular to the contour at a position that corresponds to a pointed position in the screen by the operation of the operating member 11a. Therefore, when x and y represent normal rectangular coordinates of two dimensional position of the operating member 11a, p (x, y) represents a potential distribution function showing a distribution of the potential, and f represents a vector of the force which the force generator 14 exerts to the operating member 11a, an equation f=−k×∇p (x, y) is established (k represents a constant in this case). In this case, x and y axes of the above coordinates may respectively be upward direction and rightward direction relative to the images of the user selection. In addition, the origin of the coordinates may be a center point of the image for the user selection. After step S160, one cycle of execution of the program 100 is finished.

The potential map is explained in the following.

The potential map is pre-recorded for each type of display screens, and is stored by RAM 15b or EEPROM 15d when it is output from the display control apparatuses 2-4 to the signal processing unit 15.

More specifically, the active apparatus among the display control apparatuses 2-4 outputs the signal from the potential map in association with the image for the user selection to the pointer operation apparatus 5 when the active apparatus displays a new image of the user selection.

This potential map is data to facilitate a selection of the images by the user with the representation of button shape image 21a-f as shown in FIG. 4.

The potential map has a predetermined potential distribution that maps selection images being selectable by the user to plural lowest potential areas (designated as stability areas hereinafter) in a one-to-one corresponding manner, and also maps an image being not selectable by the user (e.g., the inter-button image 21g in FIG. 4) to a higher-than-lowest potential area (designated as a force area hereinafter) in a one-to-one corresponding manner. The potential distribution is determined in advance on the display control apparatuses 2-4 side.

Solid lines 31, 33 in FIG. 4 represents a part of the potential of the selection images in the screen 20. More practically, the solid line 31 represents a potential distribution along an A-A line or a B-B line in the display screen 20, that is, a transverse potential distribution, and the solid line 33 represents a potential distribution along a C-C line, a D-D line or an E-E line in the display screen 20, that is, a longitudinal potential distribution. In this case, the potential increases toward a direction pointed by an arrow 32 in the transverse potential distribution along the solid line 31, and the potential increase in the longitudinal potential distribution is toward a direction pointed by an arrow 33 along the solid line 33.

In this way, areas corresponding to ranges 41, 42, 43, 44, 45, 46, 47 are defined as the force areas. In addition, crossing areas corresponding to ranges 51, 52, 53 and ranges 54, 55 are defined as the stability areas As a result, the potential distribution in FIG. 4 is that each of the button shape images 21a-f includes one stability area in an inside, and the stability areas are surrounded by the force area.

When the force generator 14 applies the force to the operating member 11a according to the potential distribution of the potential map, the pointer is operated by operating the operating member 11a as though it climbs a mountain of the potential from a bottom of a potential valley over to a next valley in a course of movement from one selectable image to another one. Therefore, a user operating the operating member 11a will feel a thrust force when the pointer descend the mountain as well as feeling an opposing/reactive force when the pointer climbs the mountain. Due to an application of a reactive force and a thrust force, the user senses a feeling of turning point in the course of pointer operation through the force areas among the plural selectable images. Therefore, the user utilizes a feeling of turning point in the operation of the operating member 11a for moving the pointer to be positioned in the selectable image with ease while driving a vehicle.

According to the above configuration of the image display system, the user can operate the display control apparatuses 2, 3, 4 in a unified manner through the pointer operation apparatus 5.

Figure 6:
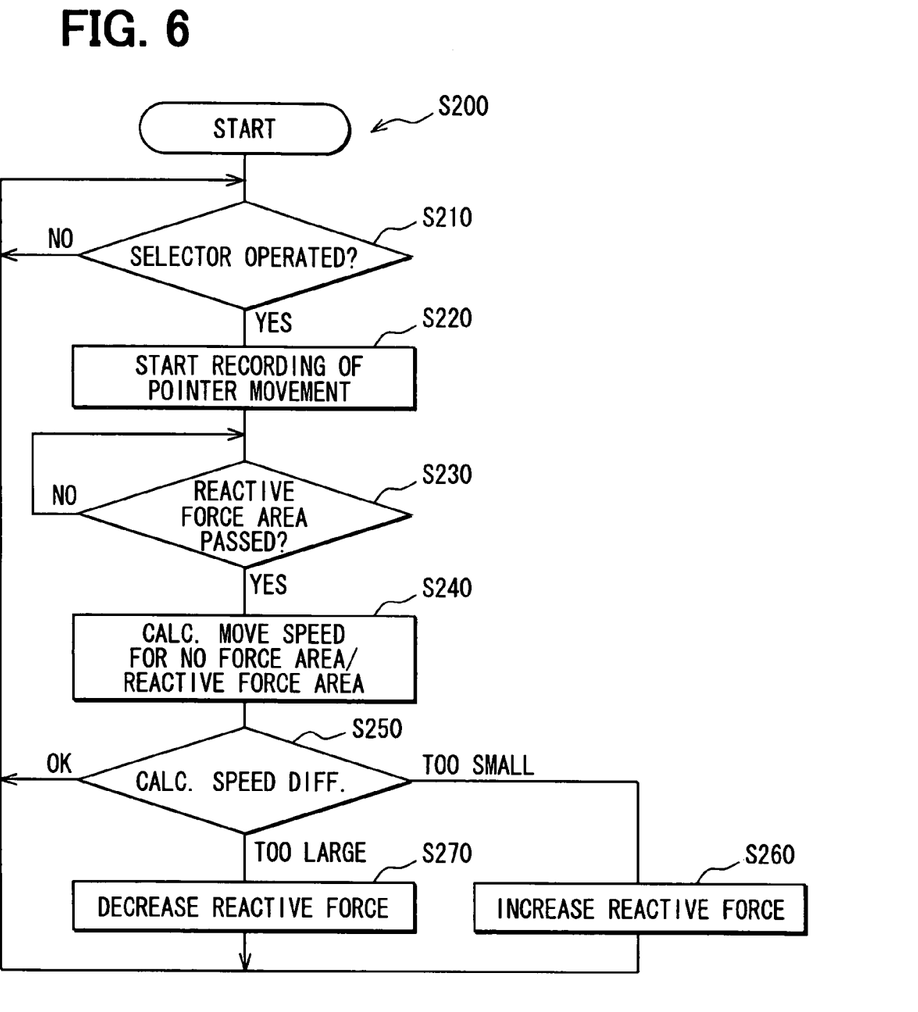
FIG. 6 shows a flowchart of another program executed by the CPU.

Beside the above configuration, a movement history of the pointer is recorded by the CPU 15a, and is used for modifying the potential map. For this purpose, the CPU 15a executes a program 200 as shown in FIG. 6 in a repeated manner.

In the execution of the program 200, the process in the CPU 15a waits until the operating member 11a of the selector 11 is operated in step S210. When the CPU 15a determines that the selector 11 is operated (S210:YES), the process records a movement path and a movement speed of the operating member 11a according to the operation in the RAM 15b or the EEPROM 15d in step S220. The movement path of the pointer and the movement speed are determined based on the detection result of the two dimensional position of the operating member 11a.

In step S230, the process determines whether the pointer has passed the reactive force area. That is, in other words, based on a current potential map, it is determined whether the pointer has finished going up a slope of the potential. The determination of the potential climbing is kept until the process yields an affirmative result. Then, the recording of the movement path and speed is concluded, and the process proceeds to step S240.

Figure 7:
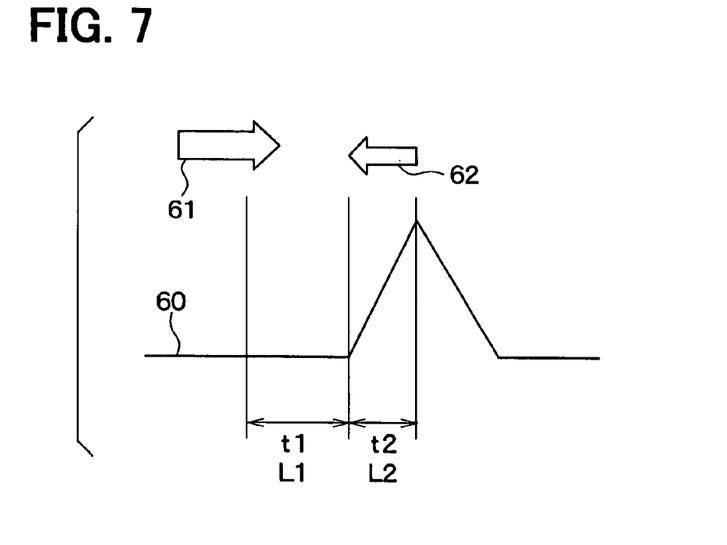
FIG. 7 shows an illustration of a calculation method of a speed of a pointer movement.

In step S240, the process calculates a difference of the pointer movement speeds in a no force area and in the reactive force area. The pointer movement speed in the no force area is designated as a "flat speed" hereinafter, and the pointer movement speed in the reactive force area is designated as an "uphill speed" hereinafter. In this case, the reactive force area indicates a period of a "slope climbing" operation that starts at the beginning of climbing the slope of the potential and ends by the affirmative determination in step S230 (i.e., at the turning point to "descending"). Further, the no force area indicates an operation period of the operating member 11a immediately prior to the reactive force area when the operating member 11a has no reactive force applied thereto. For example, when the pointer is moved in a direction indicated by an arrow 61 along the solid line 60 as shown in FIG. 7, the flat speed is calculated as a result of a division of a pointer travel distance L1 in the no force area by a time period t1 during which the pointer is operated in the no force area, and the uphill speed is calculated as a result of a division of a pointer travel distance L2 in the reactive force area by a time period t2 during which the pointer is operated in the reactive force area.

Then, in step S250, the difference between the flat speed and the uphill speed is calculated, and the calculated difference is compared with a first standard speed difference and a second standard speed difference. In this case, the first standard speed difference is greater than the second standard speed difference. The first and second standard speed differences are used as criteria for determining whether the force from the operator is strong or weak based on the flat speed and the uphill speed. The first and the second standard speed differences are set as an upper and lower limit to define a range of speed differences that are generated by a standard operating force. In addition, the first and the second standard speed differences increase as the maximum potential value in the reactive force area increases.

When the calculated speed difference is smaller than the second standard speed difference, the process proceeds to step S260 based on a determination that the difference of the pointer movement speeds is too small when the calculated speed difference is greater than the first standard speed difference, the process proceeds to step S270 based on a determination that the difference of the pointer movement speeds is too large. When the calculated speed difference is greater than the second standard speed difference and smaller than the first standard speed difference, the process returns to step S210.

Figure 8:
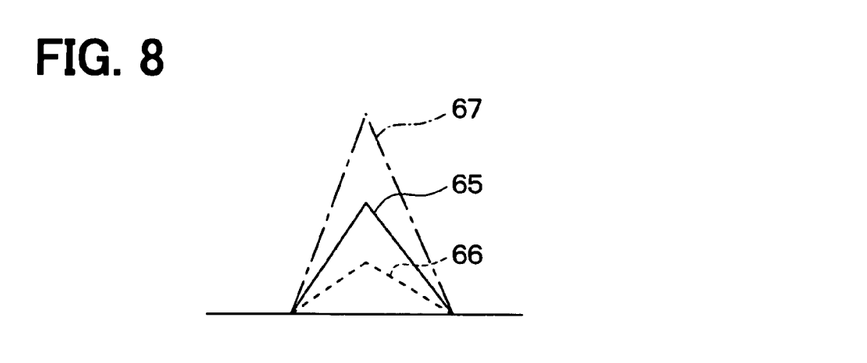
FIG. 8 shows an illustration of a calculation method of a change of a potential.

In step S260, the potential is increased for strengthen the reactive force. More practically, as illustrated in FIG. 8, a potential 65 is increased to a new potential 67 by multiplying a constant value (the value greater than 1) to an entire area of the potential.

In this case, the potential may be increased in an entire area of the display screen 20, or may be increased in a manner that increases the reactive force only in a direction along the pointer movement in the reactive force area. For example, when the reactive force area is set to have an effect only to the longitudinal pointer movement, the potential may be changed to increase the reactive force only to the longitudinal pointer movement. In an example in FIG. 4, the potential may be increased for an area between the button shape images 21a and 21d, an area between the images 21b and 21e, and an area between the images 21c and 21f, and the potential may be kept unchanged for an area between the button shape images 21a and 21b, an area between the images 21b and 21c, an area between the images 21d and 21e, and an area between the images 21e and 21f.

When the reactive force area is set to have an effect only to the transverse pointer movement, the potential may be changed to increase the reactive force only to the transverse pointer movement. The process returns to step S210 after step S260.

In step S270, the potential is decreased to weaken the reactive force. More practically, as illustrated in FIG. 8, a potential 65 is decreased to a new potential 66 by multiplying a constant value (the value smaller than 1) to an entire area of the potential.

In this case, the potential may be decreased in an entire area of the display screen 20, or may be increased in a manner that decreases the reactive force only in a direction along the pointer movement in the reactive force area. For example, when the reactive force area is set to have an effect only to the longitudinal pointer movement, the potential may be changed to decrease the reactive force only to the longitudinal pointer movement.

When the reactive force area is set to have an effect only to the transverse pointer movement, the potential may be changed to decrease the reactive force only to the transverse pointer movement. The process returns to step S210 after step S270.

In addition, the content of the potential modification in steps S260/S270 is recorded in the RAM 15b, and the recorded potential modification content is applied to a new potential map when the new potential map for a different display screen is received from the active apparatus. However, the modification content that has been used for more than a predetermined period from a first application (e.g., after an hour, a day or the like) may be discarded.

The above description is summarized that the signal processing unit 15 records, through the execution of the program 200 by the CPU 15a, the history of the movement speed of the operating member 11a (S210, S220), calculates the difference of the movement speed in the reactive force area and the movement speed in the no force area immediately prior to the reactive force area whenever the reactive force is applied from the force generator 14 (S230, S240), and compares the difference to the standard value (S250). In this manner, a peak value of the potential is decreased to have a gentle slope for generating a smaller reactive force when the difference is greater than the first standard speed difference (S270), or the peak value is increased for generating a greater reactive force when the difference is smaller than the second standard speed difference (S260). When the calculated difference is within a predetermined range (between the two standard speed differences), the potential map is kept unchanged.

In this manner, the force from the force generator 14 can be adjusted according to the actual operation speed history, thereby enabling an adaptation of the reactive force to an individual user and/or various conditions of the user.

Further, the potential for controlling the reactive force for the pointer operation is adjusted so as to decrease the proportion of the reactive force for the same pointer position when the speed difference of the pointer moving from the no force area to the reactive force area is greater than the first standard speed difference. The proportion of the reactive force for the same pointer position is increased when the speed difference is smaller than the second standard speed difference.

In the above described manner, the reactive force that can be assumed to be too strong for the user is decreased to better serve the current operation condition of the user.

Further, the reactive force that can be assumed to be too weak for the user is increased to better serve the current operation condition of the user.

Furthermore, the difference of the first and second standard speed difference is set to be greater when the reactive force in the reactive force area is greater. In this manner, a trend of decreasing and diminishing the reactive force difference between the positions where a strong/weak reactive force is intentionally defined is alleviated. In other words, an initial distribution of the reactive force on the display screen is better preserved by the above modification scheme.

Second Embodiment

The second embodiment of the present disclosure is described in terms of the difference from the first embodiment.

Figure 9:
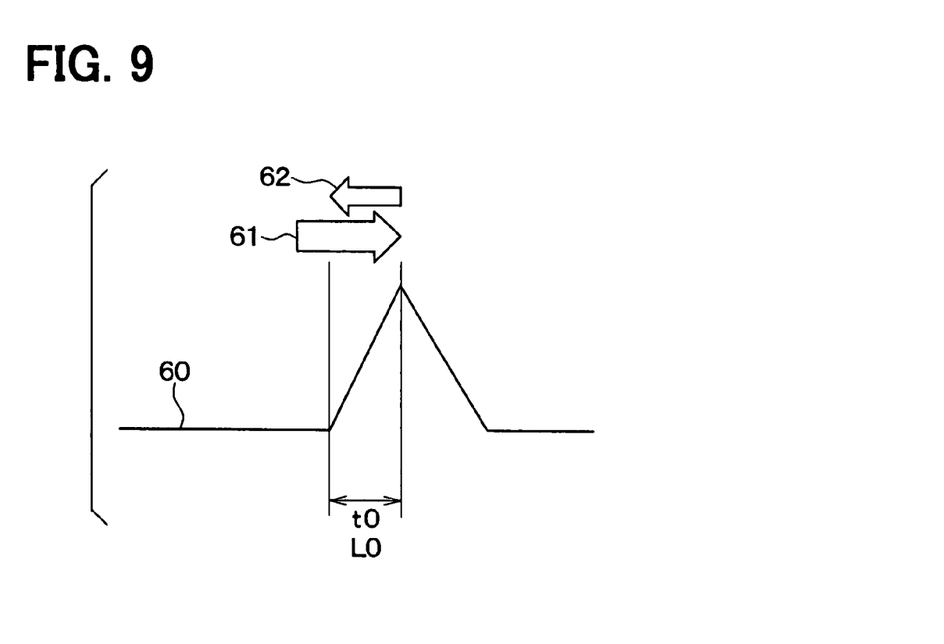
FIG. 9 shows an illustration of a calculation method of the speed of the pointer movement in a second embodiment.

The difference of the pointer operation apparatus 5 in the present embodiment from the one in the first embodiment is that the CPU 15a calculates the pointer movement speed only for the reactive force area in step S240 of the program 200, and the calculated pointer movement speed is compared with the first standard speed and the second standard speed that is smaller than the first standard speed in step S250.

More practically, when the calculated speed is greater than the first standard speed (S250:TOO SMALL), the process proceeds to step S260, and when the calculated speed is smaller than the second standard speed (S250:TOO LARGE), the process proceeds to step S270. When the calculated speed is greater than the second standard speed and smaller than the first standard speed, the process returns to step S210.

In this manner, the pointer position—applied force relationship is modified so that the reactive force from the force generator 14 is proportionally decreased when the pointer movement speed is smaller than the second standard speed in the reactive force area, and the reactive force from the force generator 14 is proportionally increased when the pointer movement speed is greater than the first standard speed.

In the above described manner, the reactive force that can be assumed to be too strong for the user is decreased to better serve the current operation condition of the user.

Further, the reactive force that can be assumed to be too weak for the user is increased to better serve the current operation condition of the user.

In this case, the first standard speed and the second standard speed decrease as the reactive force in the reactive force area increases.

In this manner, a trend of decreasing and diminishing the reactive force difference between the positions where a strong/weak reactive force is intentionally defined is alleviated.

Third Embodiment

The third embodiment of the present disclosure is described in terms of the difference from the first embodiment.

Figure 10:
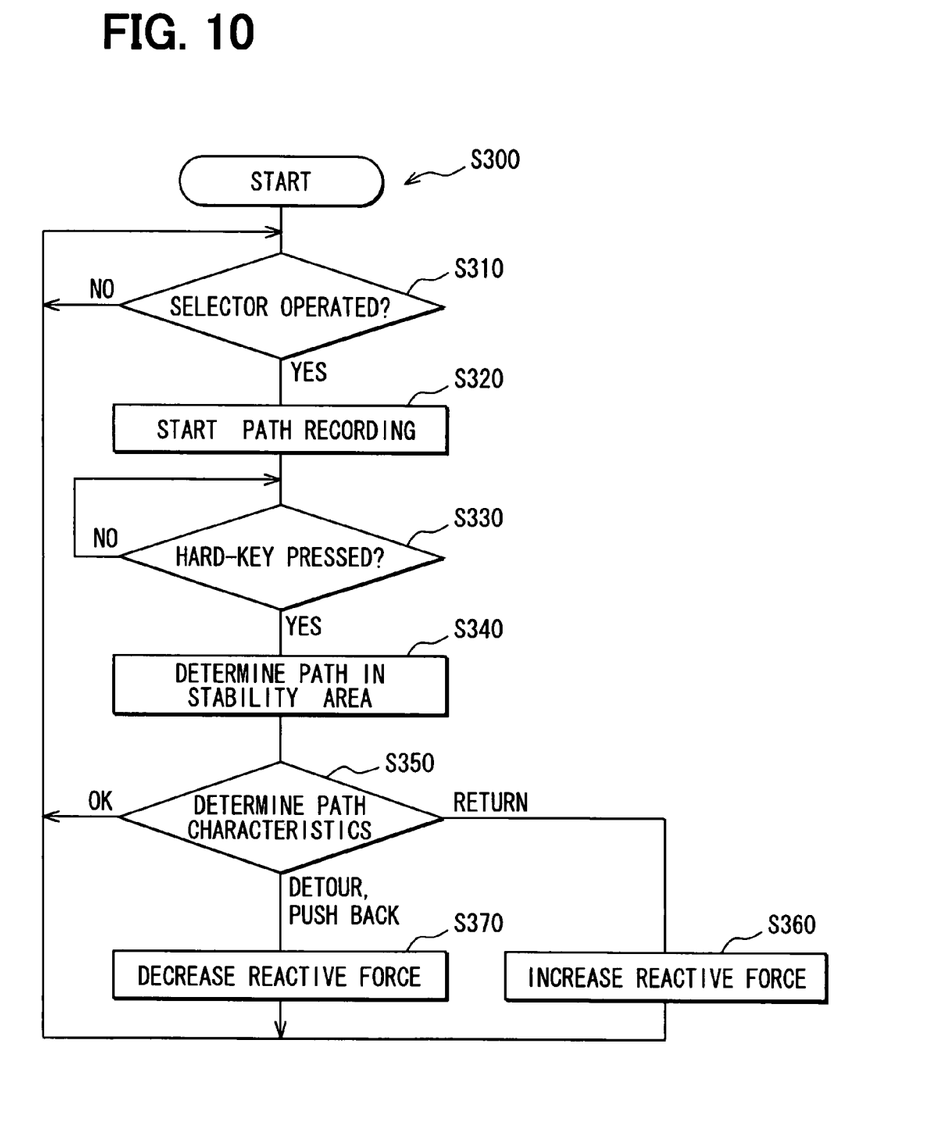
FIG. 10 shows a flowchart of another program executed by a CPU in a signal processing unit.

The CPU 15a in the pointer operation apparatus 5 of the present embodiment executes a program 300 in FIG. 10 instead of the program 200.

In an execution of the program 300, the process in the CPU 15a first waits for an operation of the operating member 11a is step S310 as in step S210, and proceeds to step S320 when the operating member 11a is operated.

In step 320, a pointer movement path based on the user operation of the operating member 11a is recorded in the RAM 15b or EEPROM 15d. A movement path of the pointer is determined based on the detection of the two dimensional position of the operating member 11a.

In step S330, the process waits for a press-down of the hard-keys 12 or 13 (or specific one of the two keys), and finishes the recording of the movement path of the pointer to proceed to step S340. In this case, in the following description, a period between a start of step S320 and an end of path recording in step S330 is designated as a selection period.

In step 340, a history of the pointer movement path in the stability area is determined based on the record of the movement path. The examples of the pointer movement path is illustrated in FIGS. 11-13.

Figure 11:
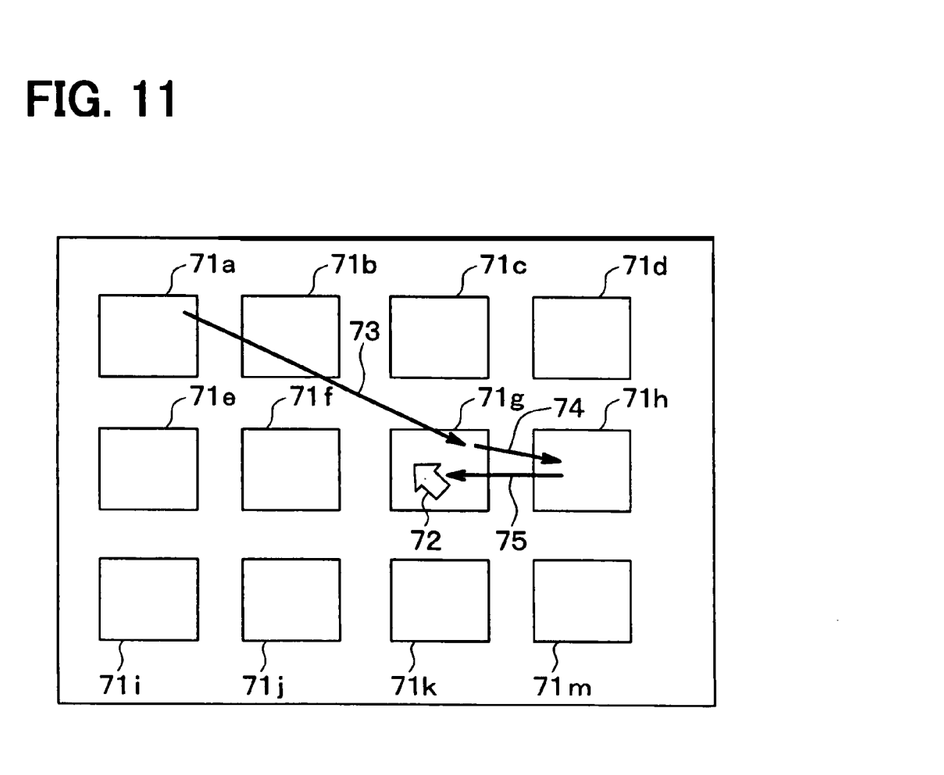
FIG. 11 shows an illustration of a trace of the pointer movement passing through a target stability area.

In the display screen 70 shown in FIG. 11, insides of the button areas 71a-m in 3×4 arrangements are defined as the stability areas, and a grid shape area between the button areas is defined as the force area. In this example, the pointer 72 proceeds through button areas 71a, 71b, 71g, 71h, 71g as indicated by arrows 73-76 before having a determination operation. When the pointer takes a path that returns to a subject stability area for the determination operation through which the pointer once passes through, the CPU 15a executes step S360 successively.

Figure 12:
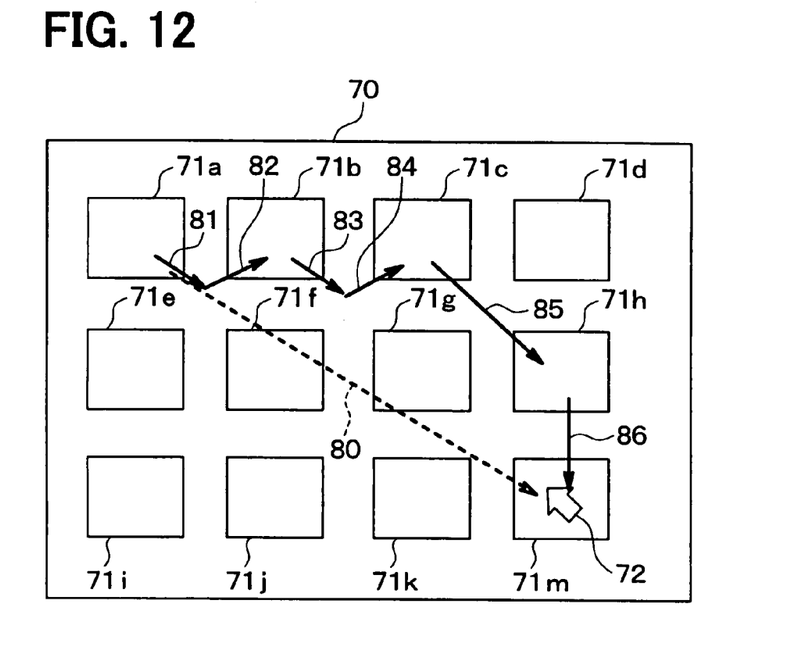
FIG. 12 shows an illustration of a trace of the pointer movement making a detour route.

In the examples of paths 81-86 in FIG. 12, the pointer 72 passes through the button area 71a, 71b, 71c, 71h, 71m before having the determination operation. However, a shortest possible path 80 to the target button area 71m from the first button area 71a is a path that passes through the button areas 71a, 71f, 71g, 71m in order. In this manner, when more than half of the stability areas in the recorded history of the pointer movement path are different from the stability areas in the optimum path 80 (equivalent to an example when a predetermined standard is being deviated from), the CPU 15a determines that the recorded path is an alternative route (a detour route), and step S370 is executed successively.

Figure 13:
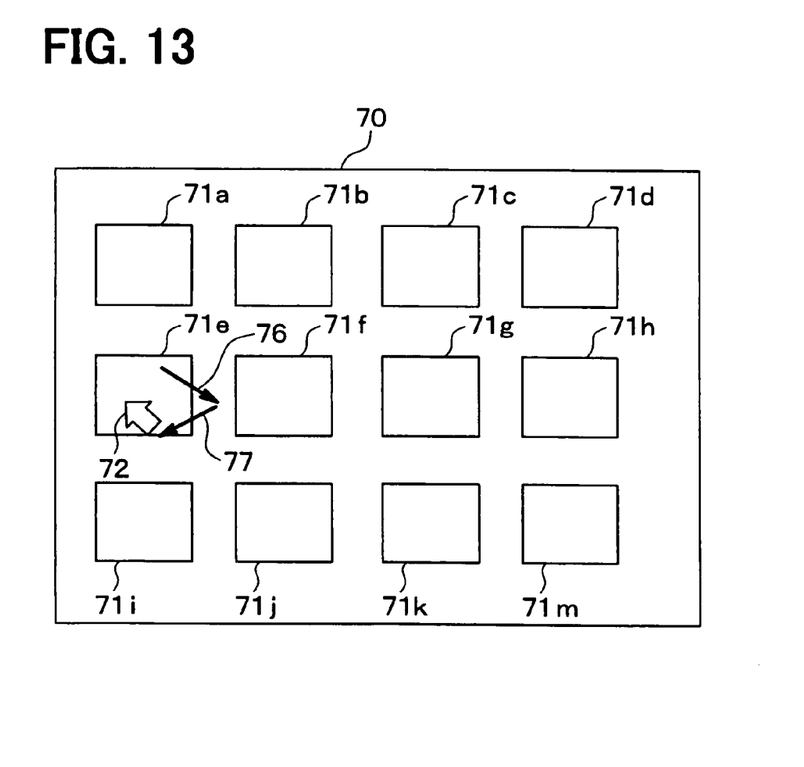
FIG. 13 shows an illustration of a trace of the pointer movement being pressed back to the stability area.

In an example shown in FIG. 13, the movement path of the pointer 72 indicated by arrows 76, 77 (the arrow after 77 toward a target area is not shown in the figure) returns to the button area 71e after passing through the button area 71e without entering another button area. In this case, the CPU 15a determines that the recorded path is a pressed back path, and step 370 is executed successively.

The process in steps S360 and S370 is same as the process in steps S260 S270 of the program 200 respectively. In addition, a modified content of the potential applied in steps S360 and S370 is recorded in the RAM 15b, and the recorded content of the potential is applied to a new potential map when the new potential map is received from the active apparatus for the new display screen. However, the modification content that has been used for more than a predetermined period from a first application (e.g., after an hour, a day or the like) may be discarded.

The above description is summarized that the signal processing unit 15 records, through the execution of the program 300 by the CPU 15a, the history of the pointer movement path for the selection period, that is the period between the start of the operation of the operating member 11a and the determination operation by using the hard-keys 12, 13 (S310, S320, S330), determines what stability areas the pointer movement path has passed through (S340), and modifies potential map (S360, S370) according to the characteristics of the movement path transiting between the stability areas (S350).

In this manner, an adjustment according to the history of the pointer position history in a situation that the user intends to use a certain function of the display control apparatuses 2-4 is performed for providing a practical adjustment function.

More practically, the force in the pointer position—applied force relationship is modified so that the applied force in the relationship is decreased based on the fact that the pointer movement path between the stability areas in the selection period is a detour route. That is, the pointer movement path with a detour route indicates that the user operation for seeking the shortest path has been highly possibly disturbed by the reactive force from the force generator 14. Therefore, decreasing the force in the pointer position—applied force relationship appropriately serves the user in terms of decreasing the reactive force that disturbs the intended user operation.

Further, the force in the pointer position—applied force relationship is modified so that the applied force in the relationship is increased based on the fact that the pointer movement path between the stability areas in the selection period is a return route that once passes through a final target position.

That is, the pointer movement path with a return route with a pass through trip from the final target position indicates that the user operation for seeking the target position has created an excessive movement that passes through the target position despite the reactive force applied thereto. Therefore, increasing the force in the pointer position—applied force relationship highly possibly serves the user appropriately in terms of positioning the pointer to the intended target position.

Furthermore, the force in the pointer position—applied force relationship is modified so that the applied force in the relationship is decreased based on the fact that the pointer movement path between the stability areas in the selection period is a pushed back that is caused by the force from the force generator 14. In this case, the pushed back path of the pointer movement path indicates that the pointer in a certain stability area without the force from a force generator takes a path that returns to the original stability area without reaching another stability area after leaving the original stability area.

That is, the pointer movement path taking the pushed back path highly possibly indicates that the reactive force for the user operation is too strong to prevent the pointer from moving one stability area to another. Therefore, decreasing the force in the pointer position—applied force relationship appropriately serves the user in terms of decreasing the possibility of having the pushed back path of the pointer.

In addition, the CPU 15a may determine whether the pointer has taken a pushed back path prior to the determination operation.

Other Embodiments

Although the present invention has been fully described in connection with the preferred embodiment thereof with reference to the accompanying drawings, it is to be noted that various changes and modifications will become apparent to those skilled in the art.

For example, in the first and second embodiments, the first standard speed difference and the second standard speed difference may be modified according to the maximum value of the potential in the reactive force area and the pointer movement distance L1 in the reactive force area. Further, for example, the first standard speed difference and the second standard speed difference may be increased in proportion to the potential inclination in a direction along the pointer movement direction in the reactive force area, that is, a value derived from division of the maximum potential value in the reactive force area by the pointer movement distance L1.

In this manner, reactive force control that considers the inclination difference of the potential slopes is realized. That is, in other words, the reactive force is changed for the pointer that climbs the potential slope straight to the "peak" and for the pointer that climbs the potential slope with a traverse movement (diagonally against the straight path).

The CPU 15a of signal processing unit 15 may exclude a predetermined portion of the movement history immediately after a start of the pointer operation (e.g., for a period of user operation until the pointer passes one of the stability areas) from the calculation of the movement speed (step S240 in the program 200) and from the calculation of the stability area (step S340 in the program 300).

The predetermined period described above is excluded from the calculation because the user tends to operate the pointer slowly at the beginning of the pointer operation. In this manner, by removing an initial pointer movement from the adjustment calculation, the practicality of the potential adjustment is improved.

The CPU 15a of the signal processing unit 15 may also exclude a predetermined period prior to the determination operation by the operating member 11a from the calculation (step S240 in the program 200 and step S340 in the program 300).

This is because the user tends to operate the pointer cautiously before the determination operation. In this manner, by removing a predetermined period of the pointer movement from the adjustment calculation, the practicality of the potential adjustment is improved.

Furthermore, the selection period of the pointer movement (i.e., from the start of the pointer operation until the determination operation) may be excluded from the adjustment calculation when a total pointer movement distance in the selection period is smaller than a standard movement distance (e.g., when the pointer is moved only for one stability area/two stability areas or less).

This is because the user tends to operate the pointer cautiously when the pointer movement in the selection period is small. In this manner, by removing a short distance pointer movement from the adjustment calculation, the practicality of the potential adjustment is improved.

Furthermore, the pointer position in step 110 of the program 100, step 220 of the program 200, step 320 of the program 300 may be determined based on the operated position of the operating member 11a as in the above-mentioned embodiments, or may be determined based on a pointer position information output from the active apparatus.

The pointer operation apparatus 5 may have a different shape from the one shown in FIGS. 2 and 3. That is, for example, the pointer operation apparatus 5 may have a joystick like shape.

The CPU 15a may execute the programs 200 and 300 in parallel.

Such changes and modifications are to be understood as being within the scope of the present invention as defined by the appended claims.

What is claimed is:

1. A pointer operation apparatus comprising:
   an operation unit that is susceptible to a movement caused by a user operation;
   a force applicator that applies a force to the operation unit;
   a signal output unit that outputs a position signal to a display control unit according to a position of the operation unit;
   an association unit that associates a pointer position displayed on a display unit under control of the display control unit according to the position signal and the force applied to the operation unit by the force applicator by using a predetermined relationship;
   a force control unit that controls the force applicator to yield a force that accords with a current pointer position based on the predetermined relationship determined by the association unit;
   a recording unit that records a movement history of the pointer position; and
   a user input unit that receives a determination instruction for determining the pointer position from a user,
   wherein the association unit changes the predetermined relationship based on the movement history recorded by the recording unit,
   wherein the association unit changes the predetermined relationship based on the movement history of the pointer position during a selected period that is defined as a period between a start of the user operation of the operation unit and the determination instruction by using the user input unit, and
   wherein the association unit decreases the force in the predetermined relationship based on a fact that the trace of a pointer position movement in the selected period is a detour path.

2. The pointer operation apparatus as in claim 1,
wherein the association unit increases the force in the predetermined relationship when a speed difference between a first speed of a pointer position movement in a first period when the force applicator does not applies a reactive force to the operation unit and a second speed of a pointer position movement in a second period that succeeds the first period, during which the force applicator applies a reactive force to the operation unit is smaller than a standard difference, and
wherein the increased force is recorded in the association unit and is used as a new predetermined relationship.

3. The pointer operation apparatus as in claim 1,
wherein the association unit increases the force in the predetermined relationship when a speed of a pointer position movement in a period during which the force applicator applies a reactive force to the operation unit is greater than a standard speed.

4. The pointer operation apparatus as in claim 1,
wherein the association unit excludes the movement history in a standard period after a start of an operation of the operation unit from a subject movement history that is used to change the predetermined relationship.

5. The pointer operation apparatus as in claim 1 further comprising:
a user input unit that receives a determination instruction for determining the pointer position from a user,
wherein the association unit excludes the movement history in a standard period that immediately precedes the determination instruction from a user from a subject history that is used to change the predetermined relationship.

6. The pointer operation apparatus as in claim 1 further comprising:
a user input unit that receives a determination instruction for determining the pointer position from a user,
wherein the association unit excludes the movement history in the selected period from a subject movement history that is used to change the predetermined relationship when an amount of a pointer position movement in the selected period is smaller than a standard movement distance in the selected period.

7. A pointer operation apparatus comprising:
an operation unit that is susceptible to a movement caused by a user operation;
a force applicator that applies a force to the operation unit;
a signal output unit that outputs a position signal to a display control unit according to a position of the operation unit;
an association unit that associates a pointer position displayed on a display unit under control of the display control unit according to the position signal and the force applied to the operation unit by the force applicator by using a predetermined relationship;
a force control unit that controls the force applicator to yield a force that accords with a current pointer position based on the predetermined relationship determined by the association unit;
a recording unit that records a movement history of the pointer position; and
a user input unit that receives a determination instruction for determining the pointer position from a user,
wherein the association unit changes the predetermined relationship based on the movement history recorded by the recording unit,
wherein the association unit changes the predetermined relationship based on the movement history of the pointer position during a selected period that is defined as a period between a start of the user operation of the operation unit and the determination instruction by using the user input unit, and
wherein the association unit increases the force in the predetermined relationship based on a fact that the trace of a pointer position movement takes a return path that passes a final pointer position in the selected period before returning to the final pointer position.

8. The pointer operation apparatus as in claim 7,
wherein the association unit excludes the movement history in a standard period after a start of an operation of the operation unit from a subject movement history that is used to change the predetermined relationship.

9. The pointer operation apparatus as in claim 7 further comprising:
a user input unit that receives a determination instruction for determining the pointer position from a user,
wherein the association unit excludes the movement history in a standard period that immediately precedes the determination instruction from a user from a subject history that is used to change the predetermined relationship.

10. A pointer operation apparatus comprising:
an operation unit that is susceptible to a movement caused by a user operation;
a force applicator that applies a force to the operation unit;
a signal output unit that outputs a position signal to a display control unit according to a position of the operation unit;
an association unit that associates a pointer position displayed on a display unit under control of the display control unit according to the position signal and the force applied to the operation unit by the force applicator by using a predetermined relationship;
a force control unit that controls the force applicator to yield a force that accords with a current pointer position based on the predetermined relationship determined by the association unit; and
a recording unit that records a movement history of the pointer position,
wherein the association unit changes the predetermined relationship based on the movement history recorded by the recording unit, and
wherein the association unit decreases the force in the predetermined relationship based on a fact that the trace of a pointer position movement is a path of a forced back route under an influence of the force from the force applicator.

11. The pointer operation apparatus as in claim 10,
wherein the association unit excludes the movement history in a standard period after a start of an operation of the operation unit from a subject movement history that is used to change the predetermined relationship.

12. The pointer operation apparatus as in claim 10 further comprising:
a user input unit that receives a determination instruction for determining the pointer position from a user,
wherein the association unit excludes the movement history in a standard period that immediately precedes the determination instruction from a user from a subject history that is used to change the predetermined relationship.

13. A pointer operation apparatus comprising:
an operation unit that is susceptible to a movement caused by a user operation;
a force applicator that applies a force to the operation unit;
a signal output unit that outputs a position signal to a display control unit according to a position of the operation unit;
an association unit that associates a pointer position displayed on a display unit under control of the display control unit according to the position signal and the force applied to the operation unit by the force applicator by using a predetermined relationship;
a force control unit that controls the force applicator to yield a force that accords with a current pointer position based on the predetermined relationship determined by the association unit; and
a recording unit that records a movement history of the pointer position,
wherein the association unit changes the predetermined relationship based on the movement history recorded by the recording unit, and
wherein the association unit decreases the force in the predetermined relationship when a speed difference between a speed of a pointer position movement in a first period during which the force applicator does not apply a reactive force to the operation unit and a speed of a pointer position movement in a second period that succeeds the first period, during which the force applicator applies a reactive force to the operation unit is greater than a standard difference.

14. The pointer operation apparatus as in claim 13,
wherein the standard difference increases in proportion to the reactive force.

15. The pointer operation apparatus as in claim 13,
wherein the association unit excludes the movement history in a standard period after a start of an operation of the operation unit from a subject movement history that is used to change the predetermined relationship.

16. The pointer operation apparatus as in claim 13 further comprising:
a user input unit that receives a determination instruction for determining the pointer position from a user,
wherein the association unit excludes the movement history in a standard period that immediately precedes the determination instruction from a user from a subject history that is used to change the predetermined relationship.

17. A pointer operation apparatus comprising:
an operation unit that is susceptible to a movement caused by a user operation;
a force applicator that applies a force to the operation unit;
a signal output unit that outputs a position signal to a display control unit according to a position of the operation unit;
an association unit that associates a pointer position displayed on a display unit under control of the display control unit according to the position signal and the force applied to the operation unit by the force applicator by using a predetermined relationship;
a force control unit that controls the force applicator to yield a force that accords with a current pointer position based on the predetermined relationship determined by the association unit; and
a recording unit that records a movement history of the pointer position,
wherein the association unit changes the predetermined relationship based on the movement history recorded by the recording unit, and
wherein the association unit decreases the force in the predetermined relationship when a speed of a pointer position movement in a period during which the force applicator applies the reactive force to the operation unit is smaller than a standard speed.

18. The pointer operation apparatus as in claim 17,
wherein the standard speed decreases in reverse proportion to the reactive force.

19. The pointer operation apparatus as in claim 17,
wherein the association unit excludes the movement history in a standard period after a start of an operation of the operation unit from a subject movement history that is used to change the predetermined relationship.

20. The pointer operation apparatus as in claim 17 further comprising:
a user input unit that receives a determination instruction for determining the pointer position from a user,
wherein the association unit excludes the movement history in a standard period that immediately precedes the determination instruction from a user from a subject history that is used to change the predetermined relationship.

* * * * *